United States Patent [19]

Oelfke

[11] Patent Number: 5,093,556
[45] Date of Patent: Mar. 3, 1992

[54] RETHERMALIZATION CART ASSEMBLY

[75] Inventor: Clifford M. Oelfke, Monroe, N.J.

[73] Assignee: Therma-Chill, Inc., South Plainfield, N.J.

[21] Appl. No.: 481,555

[22] Filed: Feb. 16, 1990

[51] Int. Cl.⁵ ............................................. F25B 13/00
[52] U.S. Cl. ..................................... 219/386; 219/521
[58] Field of Search ............... 219/385, 386, 387, 521; 165/918, 919

[56] References Cited

U.S. PATENT DOCUMENTS

| | | |
|---|---|---|
| 3,608,627 | 9/1971 | Shevlin . |
| 4,005,745 | 2/1977 | Colato et al. . |
| 4,019,022 | 4/1977 | Seider ................................ 219/386 |
| 4,087,147 | 5/1978 | Aumack . |
| 4,103,736 | 8/1978 | Colato et al. . |
| 4,194,109 | 3/1980 | Springer . |
| 4,203,486 | 5/1980 | Rubbright et al. . |
| 4,232,789 | 11/1980 | Springer . |
| 4,254,824 | 3/1981 | Springer . |
| 4,285,391 | 8/1981 | Bourner ............................ 219/386 |
| 4,323,110 | 4/1982 | Rubbright ........................ 219/387 |
| 4,517,446 | 5/1985 | Torning ............................ 219/386 |
| 4,751,368 | 6/1988 | Daifotes ............................ 219/432 |

FOREIGN PATENT DOCUMENTS 1219352 5/1960 France .

OTHER PUBLICATIONS

Sweetheart Serving System, brochure, ©1974.

Primary Examiner—Teresa J. Walberg
Attorney, Agent, or Firm—Curtis, Morris & Safford

[57] ABSTRACT

An apparatus for storing, refrigerating and heating food items in serving containers including a rethermalization cart including a plurality of shelves. Each of the shelves support one of a plurality of food trays thereon. Each tray has a plurality of food compartments and openings for supporting one of the serving containers. Each serving container containing food to be heated includes a cover. Each shelf of the cart has at least three heating pads conforming to the openings of the tray when the tray is inserted in the shelf. The cart also includes a plurality of individual switches each controlling all of the heater pads of each tray shelf as a set. Each switch is provided within a channel recessed from the exterior surface of the cart. The cart may also include a hinged work station attached to the exterior surfaces thereof which is movable between a first position, wherein said station extends outwardly from the cart so that each tray can be placed thereon for food preparation, and a second position, wherein the station is closely confined to said cart.

21 Claims, 9 Drawing Sheets

RETHERMALIZATION CART ASSEMBLY

BACKGROUND OF THE INVENTION

The present invention relates to an improved rethermalization cart assembly, and more particularly, to a rethermalization cart assembly wherein each shelf of the cart has a plurality of individually releasable heater pads which have varying thermal patterns. Furthermore, the present invention relates to a rethermalization cart assembly which can be hose-washed during the washing operation.

The purpose of this rethermalization system is to permit cold plating of patient meals in advance so as to achieve maximum productivity from an institution's (i.e. hospital's) kitchen staff. The cold plating of the meals enables the staff to prepare three meals per standard eight hour shift thus eliminating the evening shift that previously prepared the dinner meal. Plating the meals in advance also allows the staff to prepare the next day's breakfast meal the day before, eliminating the need for the morning work shift to start early in the morning.

Representative of a prior rethermalization cart assembly is U.S. Pat. No. 4,285,391 to Bourner. In Bourner, an electrical system is provided which includes a rocker switch projecting into an area above each shelf which actuates heating elements under the tray depending upon the orientation of the cover of the food tray on the shelf of the cart. Not only does providing such exposed rocker switches inside the cart present a problem of steam-cleaning the cart, but it also increases the chances that if the cover is not in the correct orientation due to the movement of the cart, the food in the trays will be improperly heated or cooled. This problem would be alleviated if the switches for each tray level were remote from the shelf and were protected from accidental contact.

Additionally, each shelf of the Bourner cart has a single shelf thermal plate having a plurality of heating pad elements thereon, each corresponding to the heating requirements of one of the compartments of the tray. If, however, one of the heating elements fails or is damaged, the entire shelf thermal plate must be replaced. As such, the labor and cost involved in replacing the shelf thermal plate are greatly increased. These replacement costs would be reduced, however, if each heating element was a separate releasably secured plate, and therefore, field replaceable without affecting any adjacent heating elements.

OBJECTS OF THE INVENTION

Therefore, it is an object of the present invention to provide a rethermalization cart assembly which avoids the abovedescribed difficulties of the prior art.

It is another object of the present invention to provide a rethermalization cart assembly which can be hose-washed during the washing process.

It is yet another object of the present invention to provide a rethermalization cart having a plurality of heater pads along each tray level which have varying thermal patterns.

It is still another object of the present invention to provide a rethermalization cart wherein each tray level has a plurality of heater pads of varying thermal patterns which are field replaceable without affecting the adjacent heater pads.

It is a still further object of the present invention to provide a rethermalization cart wherein each tray level is controlled by one selector switch.

It is yet another object of the present invention to provide a rethermalization cart having a selector switch panel which is protected from accidental contact.

It is yet a further object of the present invention to provide a rethermalization cart assembly having a main controller which delivers consistent, precisely controlled electrical current to the heater pads.

These and other objects, aspects and features of the present invention will become apparent from the following detailed description thereof taken in conjunction with the accompanying drawings, throughout which like reference numerals denote like elements and parts.

SUMMARY OF THE INVENTION

The present invention provides for an improved rethermalization cart assembly, and more particularly to a rethermalization cart wherein each shelf of the cart has a plurality of individually releasable heater pads which have varying thermal patterns. Additionally, the present rethermalization cart can be advantageously hose-washed during the washing operation.

Each serving tray to be received and stored by a shelf of the rethermalization cart has three open compartments into which a ceramic or disposable dish is placed. The rear of the tray has a large cold compartment. These compartments are enclosed and separated from each other by an insulated cover so that no temperature transfer occurs between the compartments. The food contained in the three ceramic or disposable dishes protrude below the bottom of the serving tray. The positioning of the protruding dishes of the tray automatically align with three (3) individual heater pads.

As aforementioned, each tray level within the rethermalization cart includes three separate heater pads. One pad is intended primarily for the rethermalization of hot cereals and soups. Another pad is used for the entree and the final pad is used for a side dish, such as a vegetable.

The heater pad assembly consists of an engineered plastic casting, a computer designed heating grid, a layer of insulation, all protected by a layer of aluminum plate. More specifically, the top surface of each heater pad includes a layer of non-stick protective coating. The computer designed heater grid is vulcanized to the underside of the aluminum top plate. The design of the heater grid is specific to the heating requirements of its corresponding food compartment which provides for the grid pattern for the three pads of each shelf to be different. Beneath the top layer of aluminum plate and its bonded heater grid is approximately ¼ inch of fiberglass insulation. The purpose of the insulation is to help direct the transfer of heat toward the dish and to shield the tray cover from unnecessary thermal conductivity. The insulation is protected from moisture or physical contact by a silicone sealant between the engineered plastic fixture and aluminum top plate. The entire heater pad assembly is thus permanently sealed to prevent water penetration and eliminate any potential residue build-up. Additionally with the heater pad designed in this manner, the assembly can be safely hose-washed during the washing operation.

The heater pad casting is fabricated with a flanged end having a left and a right mounting flange which mates to a box channel running the width of the cart at each tray level. All electrical wires run inside the box channel and connect to each heater pad. The heater pad casting is then secured with two screws which pass through the mounting flanges of the casting, into threaded holes of the box channel. The top of the box channel is provided with a snap-on top cover which also serves as a tray stop. The cover can be easily removed to provide access to the wiring harness and then resealed after re-assembly.

All three heater pads of each shelf are controlled as a set, either active or inactive, depending upon the position of a corresponding selector switch. These selector switches are contained in a channel recessed from the exterior surface of a vertical extrusion on the cart. An optional service tray is available, which when in the down position, rests upon a cross bar which connects between two tubular handrails extending from one of the side panels. The service tray is held in the "up" position by magnets which are imbedded in the tray or mounted on the cart side wall.

The amount of heat developed by each heater pa is determined by the heater grid watt density design and is thermostatically controlled. All of the soup or hot cereal heater pads of each shelf are controlled by one common output design. Likewise, the entree pads and the side dish pads are also controlled by their individual output design setting. At the top of the cart, in the center of the handle assembly, is the electrical connection to the main controller. The main controller located at the top of the refrigeration housing is supplied with a cable assembly which includes a 4-pin, quick disconnect bayonet plug. The plug connects directly to the receptacle on the cart and indexes in place to ensure a positive electrical connection. This connection must be made whenever the cart is to be used to rethermalize meals.

In order to releasably secure each tray in its corresponding shelf, along the side panels of the cart are track angles which support the trays when they are inserted in the rethermalization cart. When the trays are inserted, they are slid along the tracks until the tray travels over the heater pads. A tray stop positioned on the box channel support cover, locks the tray in position, and prevents misalignment of the tray which would cause improper rethermalization.

BRIEF DESCRIPTION OF THE DRAWINGS

The following detailed description, given by way of example but not intended to limit the invention solely to the specific embodiments described, may best be understood in conjunction with the accompanying drawings in which.

DETAILED DESCRIPTION OF THE PREFERRED EMBODIMENTS

Referring now to FIGS. 1-3 and 12, a rethermalization cart assembly is illustrated. This system includes a roll-in refrigerator 11, a rethermalization cart 12, an electronic main controller 14, and a set of serving trays 16 with insulated covers 18. This system permits cold plating of patient's meals in advance so as to achieve maximum productivity from the kitchen's staff. The cold plating of the meals enables the staff to prepare three meals per standard eight-hour shift, thus eliminating the evening shift that previously prepared the dinner meal. Plating the meals in advance allows the staff to prepare the next day's breakfast meal the day before, thereby eliminating the need for the work shift to start early in the morning and normal shifts are thus possible.

Figure 1:
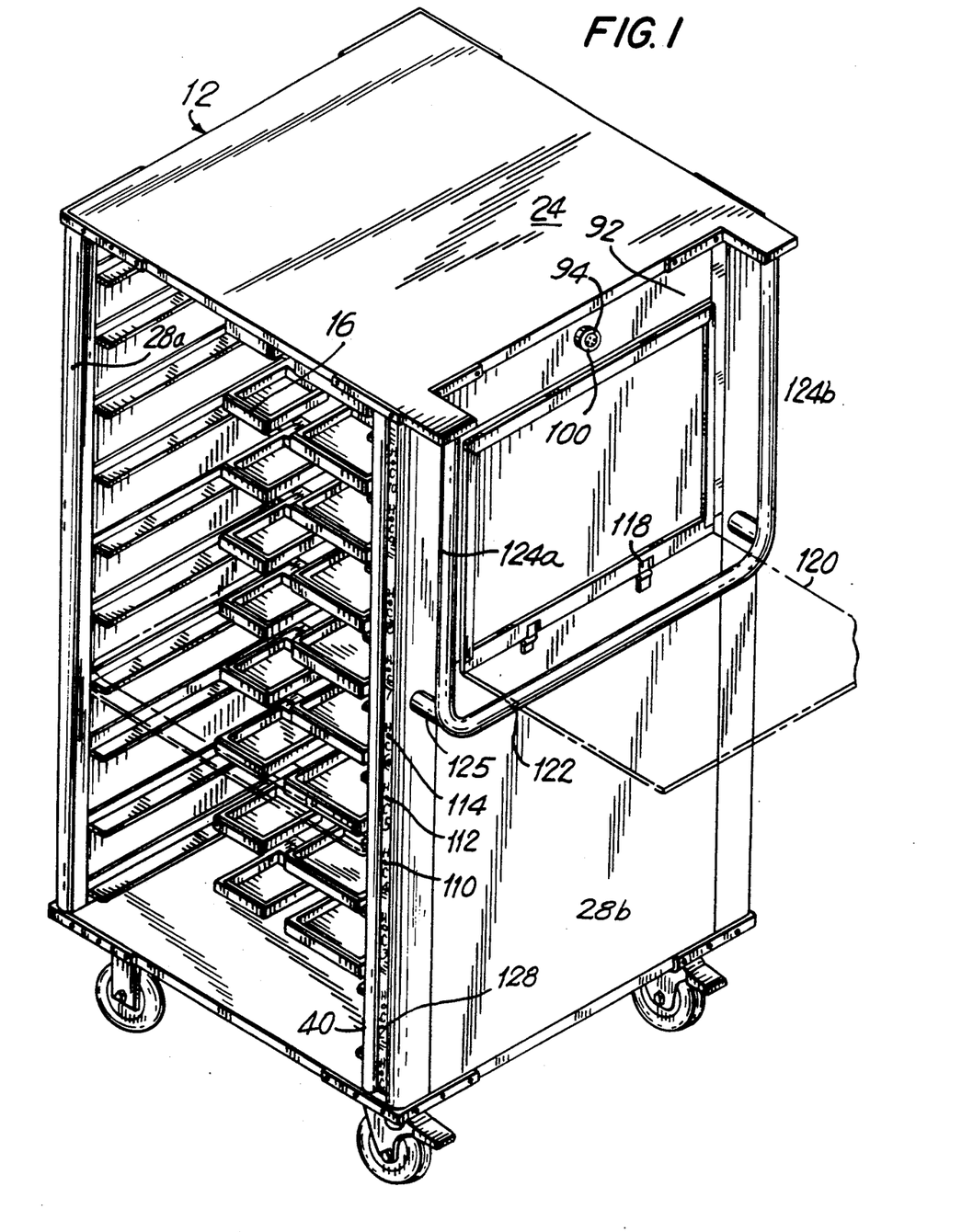
FIG. 1 is a perspective view of a preferred embodiment of the rethermalization cart assembly of this invention.
Figure 5:
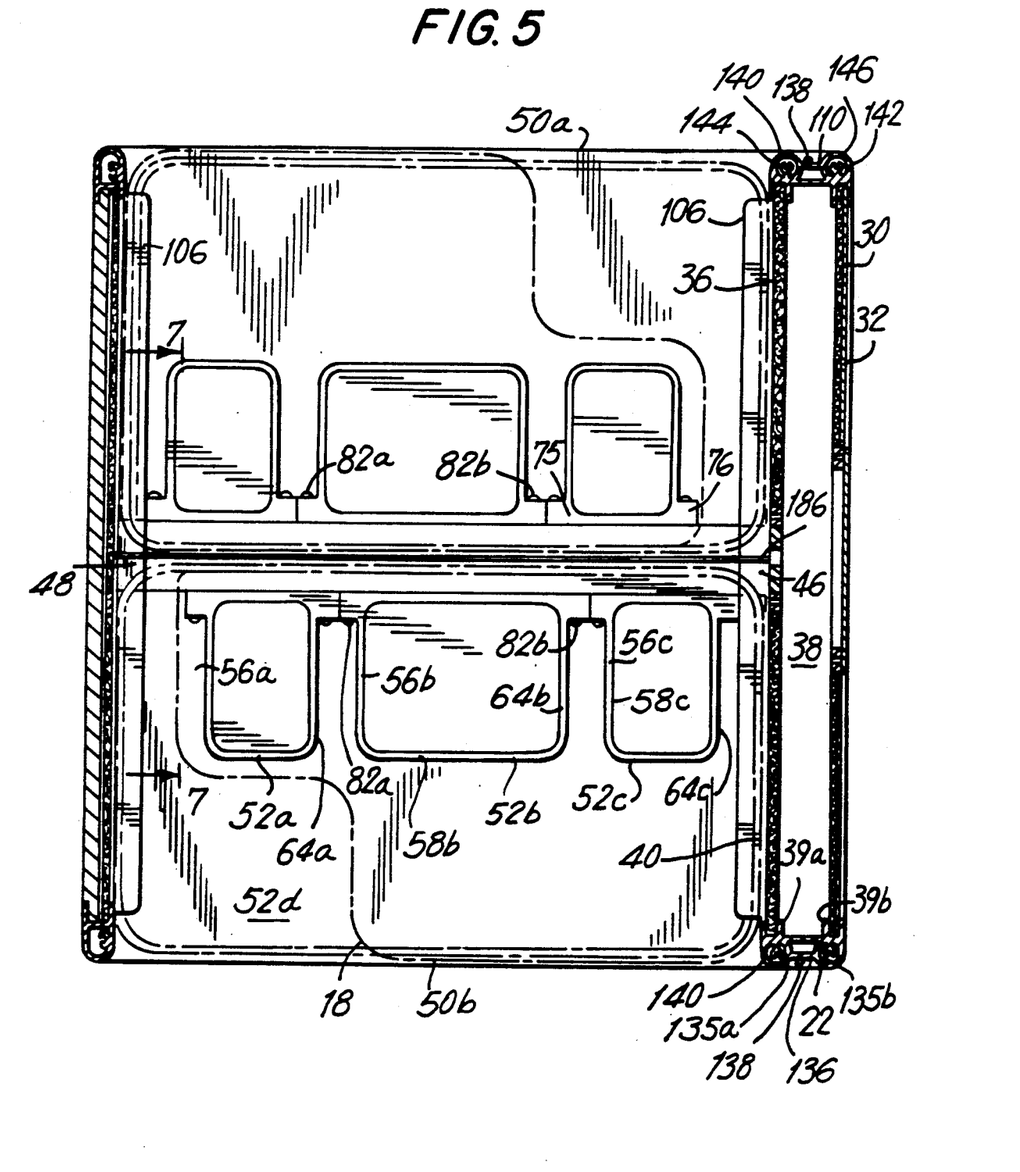
FIG. 5 is a top elevational view taken along line 5—5 of FIG. 2.

As shown in FIG. 1, the rethermalization cart 12 includes a solid aluminum base 20, which is preferably ⅜" inch thick, which has been machined to accept aluminum corner extrusions 22 as shown in FIG. 5. The top 24 of cart 12 is the mirror image of bottom or base 20. The top 24 securely locks the vertical corner extrusions 22 in place. The front and rear panels 28a and b of the cart are composed of an aluminum outer panel 30, a ⅜" inch thick aluminum honeycomb panel 32, and another aluminum inner panel 36 (see FIG. 5). These components of the front and rear panels are bonded together and then secured in a channel raceway 38 supported by inwardly extending flanges 39a and 39b of the corner extrusions 22. Each panel 28a and b separates the interior side surface 40 of the cart from its exterior side surface 42.

Figure 2:
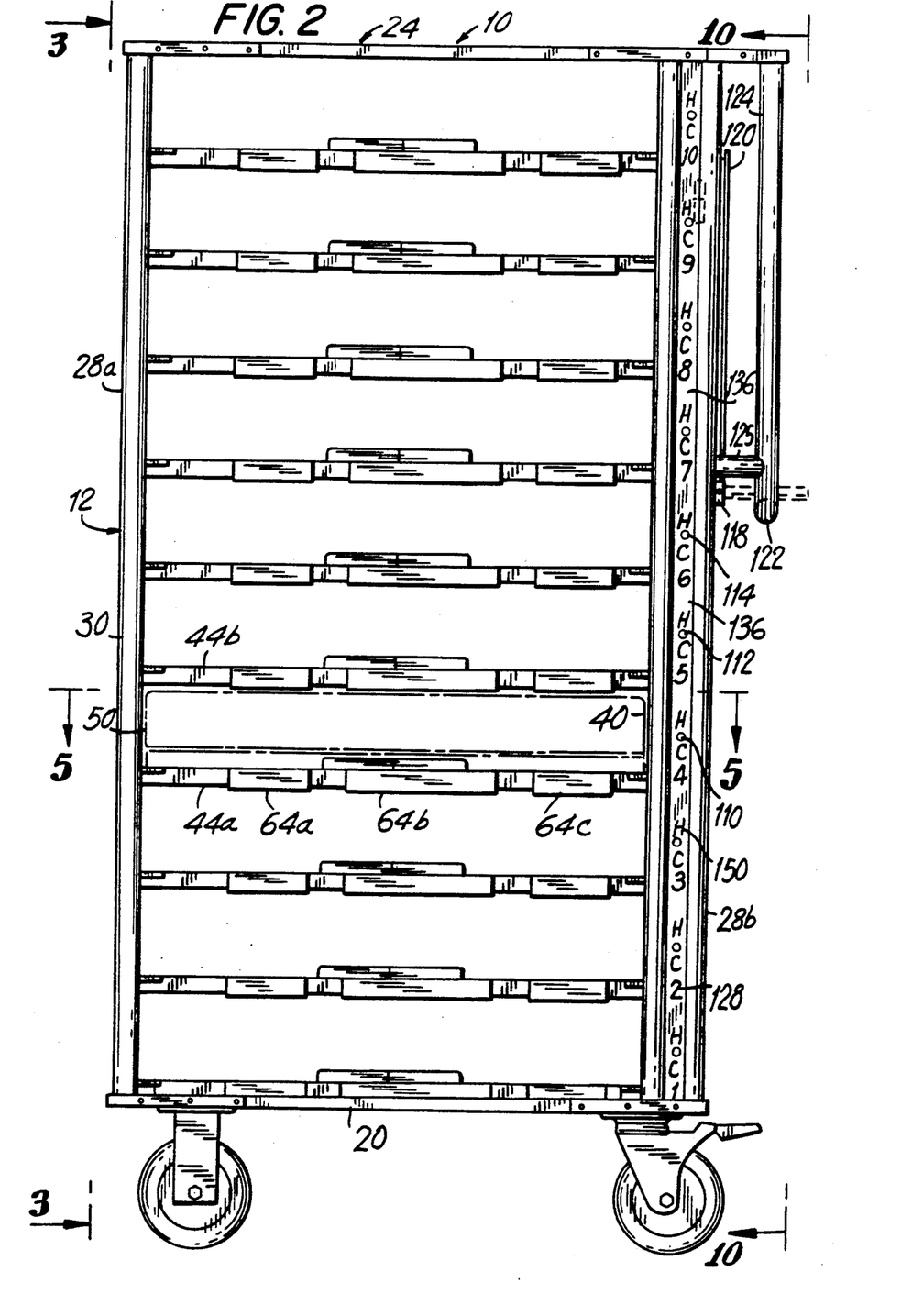
FIG. 2 is a side elevational view of the rethermalization cart of FIG. 1.
Figure 3:
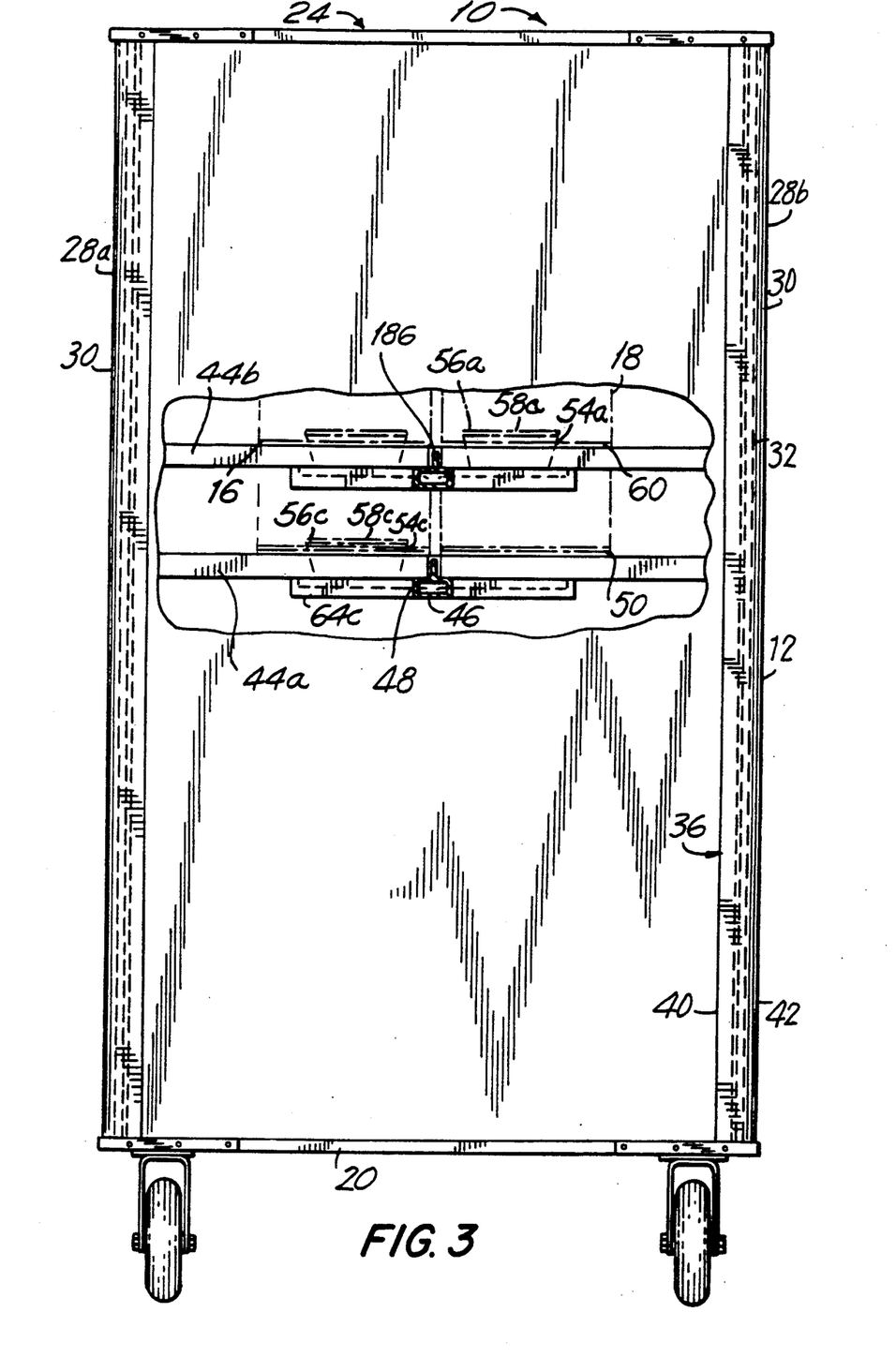
FIG. 3 is a front elevational view partly broken away taken along line 3—3 of FIG. 2 illustrating a plurality of trays being positioned within shelves of the rethermalization cart.

In order to retain a plurality of trays 50 containing food items in the cart, cart 12 includes a plurality of shelves, such as 44a and b in FIGS. 2 and 3. These shelves extend between panels 28a and b. At approximately the midline 46 of each shelf is a wiring box channel 48 (see FIG. 3) to be discussed in more detail below. Each shelf is capable of supporting at least two trays 50a and 50b as shown in FIG. 5, which are adjacent to one another along wire box channel 48.

Figure 4:
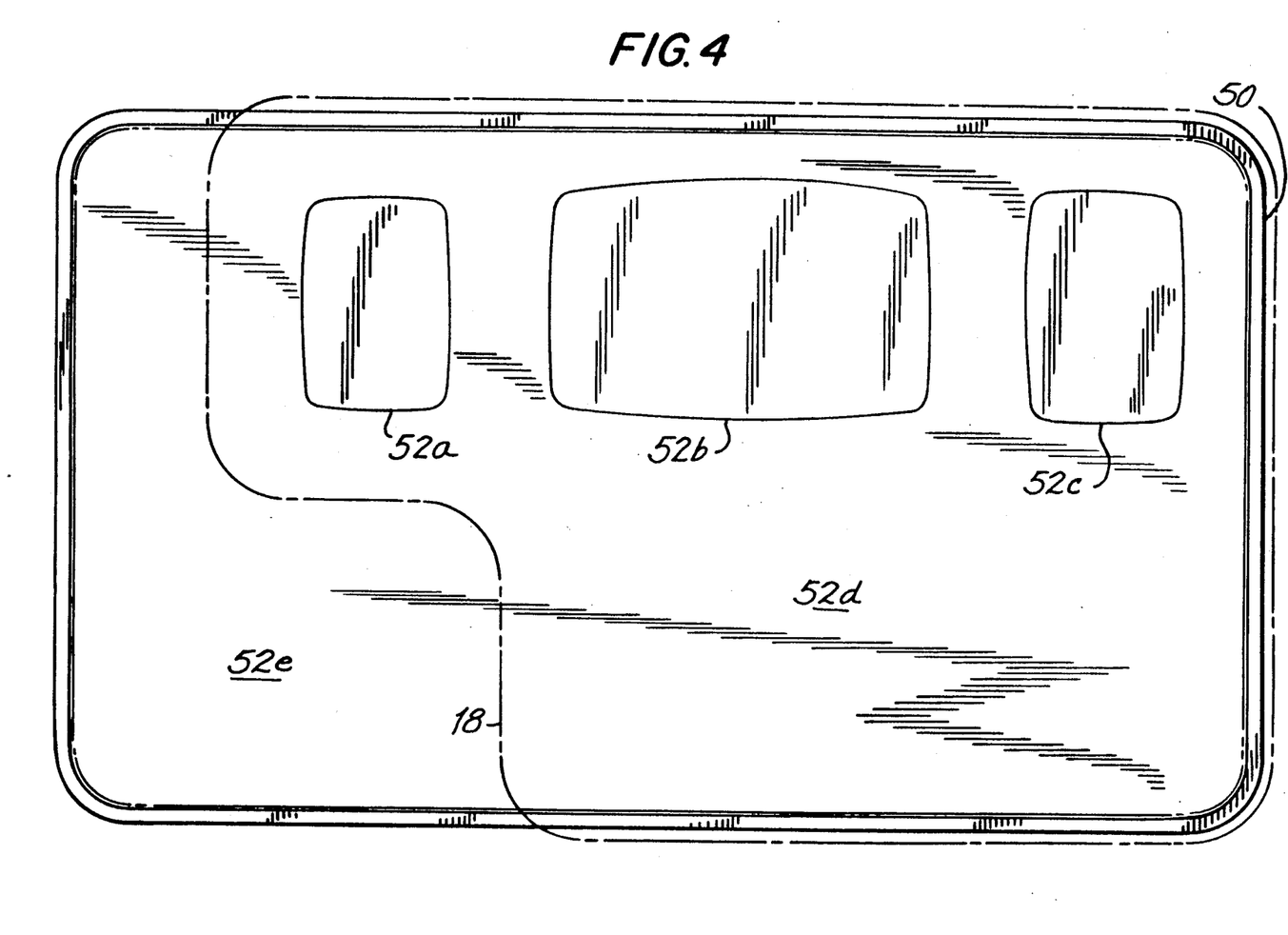
FIG. 4 is a top elevational view of a preferred embodiment of a tray to be utilized in conjunction with the rethermalization cart of this invention.

As illustrated in FIGS. 4 and 5, each tray has a plurality of compartments such as 52a, b, c, d and e. Food compartments 52a, b and c have openings 54a, b and c, respectively, for supporting one of a plurality of serving containers 56a, b and c. Each of these serving containers having food to be heated includes a cover 58a, b and c respectively. As such, the front section of each serving tray 50 has three open compartments 52a, b and c into which a ceramic or disposable dish or container 56a, b and c, respectively, is placed. The rear of the serving tray has a large cold compartment 52d. The open wing 52e of the tray is used for silverware, condiments, and placement of frozen deserts or the hot beverage.

The food items contained in the three disposable dishes 56a, b and c protrude below the bottom 60 of the serving tray (See FIG. 3). When the tray assembly is completed, an insulated cover 18 is placed over the entire tray and the whole assembly is then inserted into a shelf of the rethermalization cart 12. This cover encloses and separates the individual compartments from one another so that no temperature transfer occurs. The location of the protruding containers of the tray automatically align each of the serving containers 56a, b and c with three individual heating pad assemblies 64a, b and c, respectively, releasably secured to the shelf.

In accordance with one of the general objects of the invention, the plurality of heater pads 64a, b and c along each tray level have varying thermal patterns. These varying thermal patterns are required as each of the serving containers contains a different food item having different heating requirements. Preferably, the heater pad 64a on the left side is intended primarily for rethermalization of hot cereals and soups. The center pad 64b is used for the entree and the right side pad 64c is used for a side dish such as a vegetable.

Figure 7:
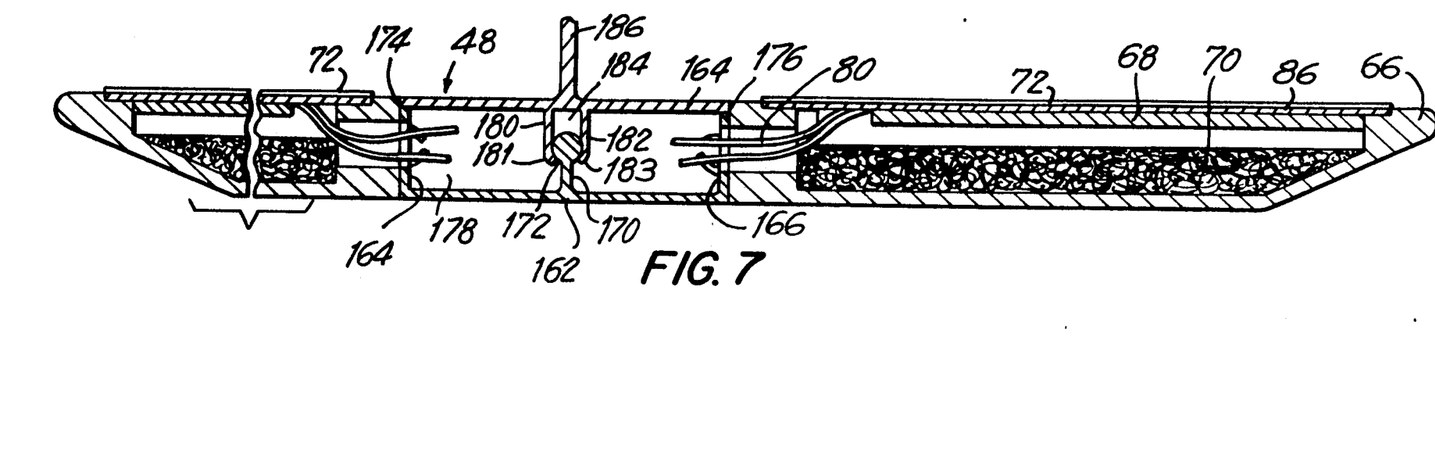
FIG. 7 is a side elevational view partly broken away taken along line 7—7 of FIG. 5.

Each heater pad is specifically constructed such that the entire assembly can be hose-washed during the washing operation. As illustrated in FIG. 7, each heater pad assembly consists of an engineered plastic resin casting 66, a computer designed heater grid 68, and a layer of insulation 70. These three components are all sealed together by one sheet of aluminum 72 which has been coated with a non-stick material.

Specifically, the top of each pad includes a layer of aluminum 72. A computer designed heater grid 68 is vulcanized to the underside 86 of the aluminum layer 72. The design of the heater grid is specific to the heating requirements which means that the grid pattern for the three pads 64a, b and c are all different. The purpose of changing the grid pattern is to develop the thermal patterns necessary for each application (i.e., the heating requirements for each serving container). The heating requirements of the soup or hot cereal heating pad are not the same as the requirement for the entree heating pad. Thus, three different grid patterns are required.

Figure 6:
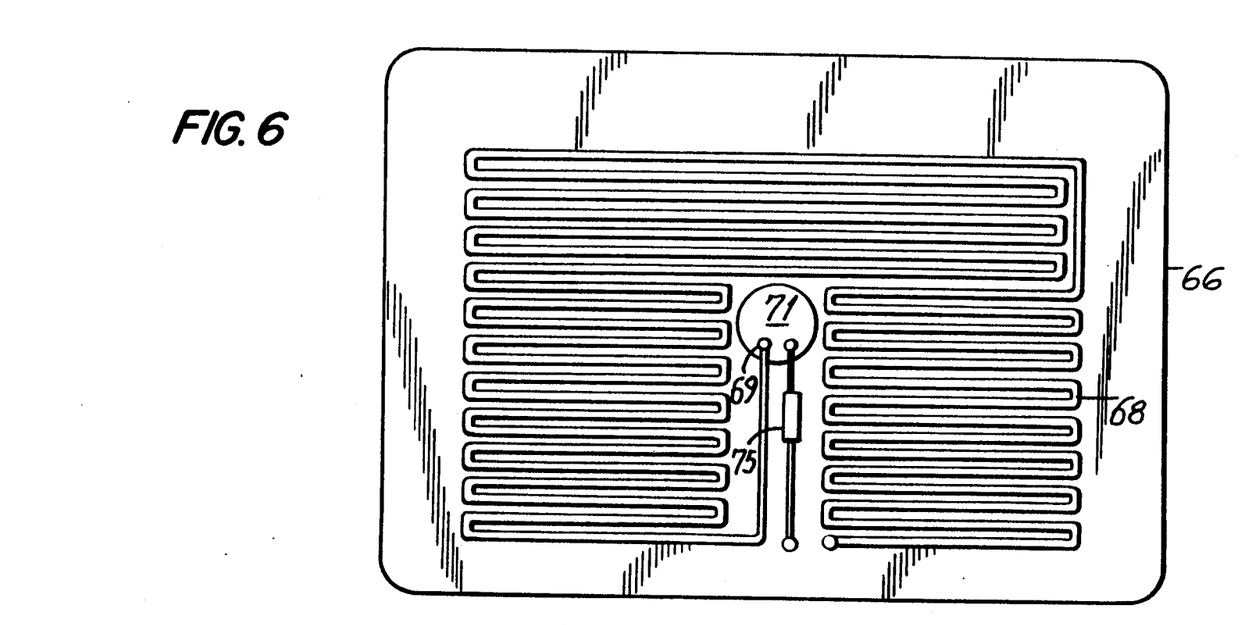
FIG. 6 is a top elevational view illustrating a preferred embodiment of the heater grid assembly to be used in conjunction with the rethermalization cart of the present invention.

As shown in FIG. 6, the computer designed heater grid 68 is connected at one end to a terminal 69 of a thermostat 71. The other terminal 73 of the thermostat is connected to a thermal fuse 75.

Beneath the bonded heater grid 68 is ¼ inch of fiberglass insulation 70. The purpose of the insulation 70 is to help direct the transfer of the heat towards the dish and t shield the tray cover below from unnecessary thermal conductivity. The insulation is protected from moisture or physical contact by the layer of aluminum 72. The resulting heater grid assembly composed of the aluminum layer 72, the engineered plastic resin casting 66, the heater grid 68 and the layer of insulation 70 is then permanently sealed with a silicone sealant to prevent water penetration and eliminate any potential residue build-up. The engineered plastic resin casting serves a dual purpose. First, it provides a protective shell into which the heater pad is assembled. Second, the casting is designed to be mechanically fastened in the cart, offering superior strength and durability.

As a result of this design of the heater pad assembly, each heater pad is field replaceable without affecting the adjoining heater pads. Additionally, the separate pads also minimize heat conductivity to the rethermalization cart structure itself, thereby reducing electrical loads, and hence, improving efficiency. In another preferred embodiment, the three heater pad assemblies can be combined to form one assembly with three computer designed heater grids formed integrally therein.

Figure 8:
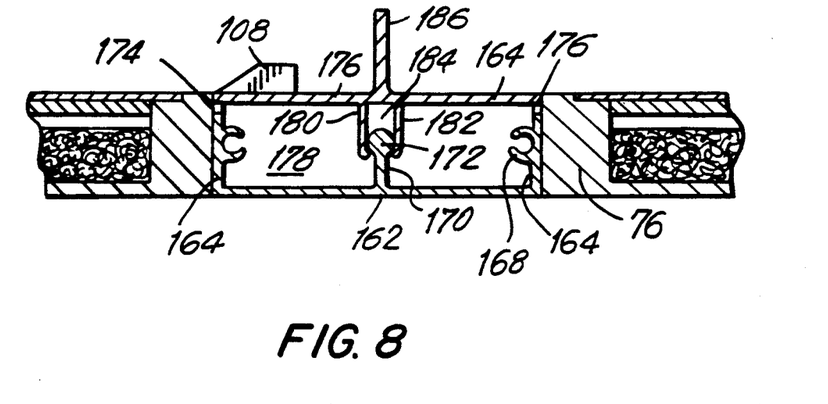
FIG. 8 is an enlarged side elevational view of the box channel assembly of FIG. 7 incorporated within a shelf of the cart.
Figure 9:
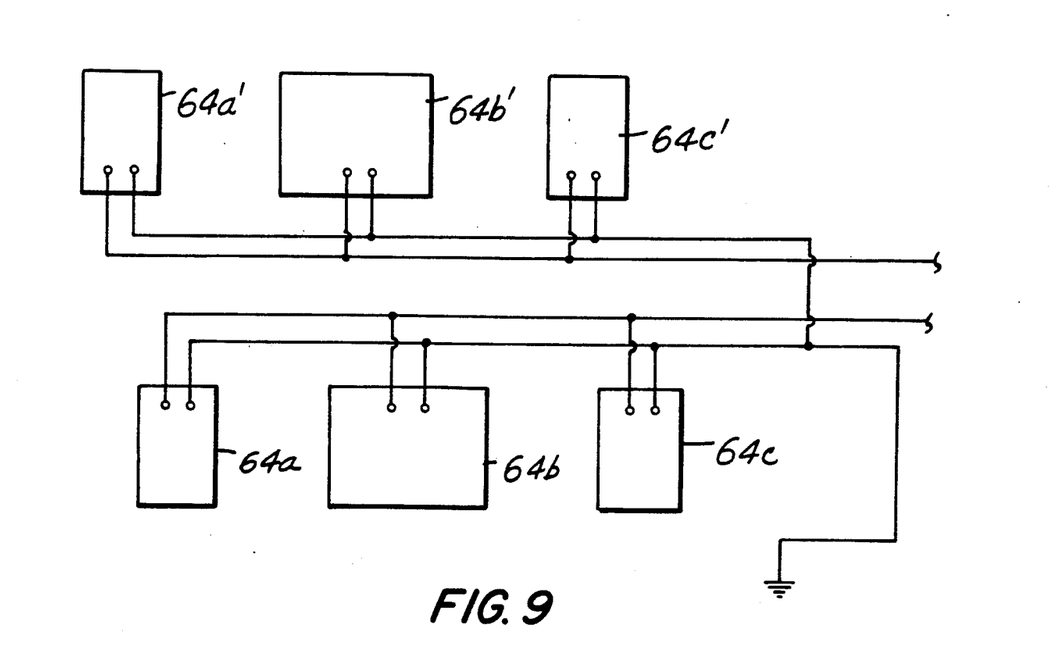
FIG. 9 is an electrical wiring diagram illustrating the wiring from each individual heating pad through the box channel to the main controller and selector switches.

Referring now specifically to FIG. 8, the heating pad casting is fabricated with first and second flanged ends 76 which are secured to the box channel 48 (see FIG. 5). All electrical wires leading to the heater pads of a shelf, such as 80 in FIGS. 7 and 9, run through openings 178 in the box channel 48 and connect to each heater pad. The heater pad casting is then secured with two screws 82a and b which pass through the flanges 75 and 76, respectively, of the casting through the box channel 48. As such, each of the heater pad assemblies 64a, b and c on a shelf are field replaceable without affecting the adjacent heater pads as the heater pad can be removed by disassembling the screws and pulling the heater pad away from the box channel to release the heater pad.

The box channel 48 has been constructed such that even the inside of the cart 12 may be hose-washed. As shown in FIG. 8, the box channel includes a base member 162 and a top member 164. The base member 162 includes a plurality of upwardly extending side web members 164 and 166 having a notch 168 extending inwardly therein which receives and retains the electrical lead wires emanating from the heater pad grids. The base member 162 also has an upwardly extending central web member 170 between the side web members 164 and 166 which includes a ball member 172 at the free end thereof. As aforementioned, the base member 162 includes a plurality of opening 178 into which all electrical wires emanating from the individual heater pad assemblies run.

The protective top member 164 of box channel 48 is matingly engageable with the base member 162 and includes a pair of outwardly extending flanges 174 and 176 which form a top cover over the central opening 178. A pair of downwardly depending members 180 and 182 are provided near the midline of the top member which form a slot 184 therebetween. These downwardly depending members 180 and 182 have curved ends 181 and 183, respectively. The ball member 172 fits within slot 184 and is engaged by curved ends 181 and 183 such that the top member is securely positioned on top of the base member. As such, the top member of the box channel snap-fits onto the base member to provide a cover. Additionally, the top member 164 includes an upwardly extending member 186 which separates each shelf into two tray compartments and provides a stop for the forward edge of the tray when it is inserted within the shelf.

Since the wires emanating from the individual heater pad assemblies run through the central opening 178 of the box channel 48, they are not exposed to the environment. As a result thereof, the interior of the cart including the heating pad assemblies may be hose-washed.

Upon filing the rethermalization cart 12 with the desired quantity of trays 50, the cart 12 is placed into a refrigerator where all the food on each tray is kept at a safe, refrigerated temperature. Thirty-five minutes before the meal is to be served, the rethermalization cycle begins. The activation of the rethermalization cycle can be done either manually or automatically as will be discussed below. During this cycle, the three heater pads 64a, b and c heat up, transferring their generated heat to the three dishes to be heated. By the end of the cycle, the food in each dish will have reached a temperature in excess of 160°-170° F. The insulated overall cover 18 serves to restrict the heat transfer from the surrounding cold foods on the tray as well as to aid in maintaining food temperatures during meal delivery.

As aforementioned, the amount of heat developed by each individual heater pad 64a, b and c is determined by the individual heater pad design. All the soup or hot cereal heater pads 64a and 64a' are predetermined by one heater pad design. Likewise, the entree pad 64b and 64b' and the side-dish pads 64c and 64c' are also controlled by a specific heater pad design (see FIG. 9).

Figure 12:
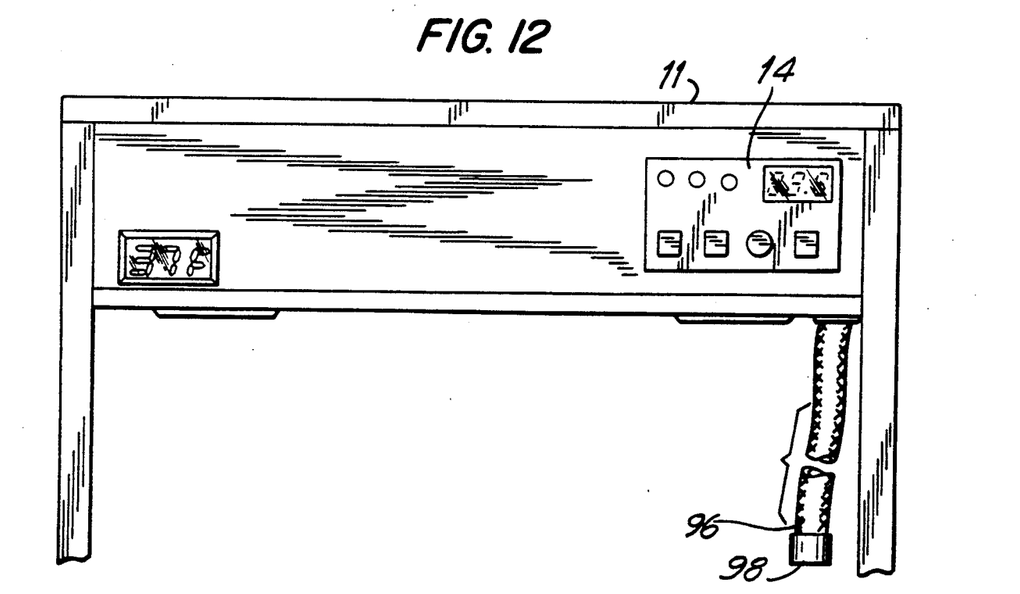
FIG. 12 is a front elevational view partly broken away of a preferred embodiment of a refrigeration unit (specifically illustrating a main controller 14) to be used in conjunction with the improved rethermalization cart of this invention.

The main controller 14 is permanently mounted on the front face of each refrigerator (see FIG. 12). Precise control characteristics of the main controller limit the heat duration of the heater pads. The accuracy of the main controller, coupled with the high quality of the heater pad grid, results in a very consistent, efficient system.

The primary purpose of the main controller is to deliver consistent, precisely controlled electrical current to each heater pad. The controller includes a voltage transformer which accepts 208/230 VAC input and delivers the necessary output voltage and current to the pads.

The second function of the main controller is to time the rethermalization cycle. Once the cycle has started, a digital display begins counting down from thirty-five minutes. When the thirty-five minutes have elapsed, an audible signal will sound for ten seconds. If the main controller is not turned off within ten minutes, a "hold" cycle will begin which will apply heat to the food for two minutes. At the end of the two-minute heat cycle, the alarm will once again sound for ten seconds. This sequence will repeat indefinitely until the main controller is turned off.

The main controller also provides for a three event, twenty-four hour, automatic timer. Once set for the start times of all three meals, the automatic timer will automatically start the rethermalization cycle at each mealtime. This feature eliminates the need for each rethermalization cycle to be started manually. This timer is especially advantageous in those applications where multiple rethermalization carts are in use and are to be sequentially started according to predetermined serving schedules.

As shown in FIG. 1, at the top portion 92 of the rear panel 28b of cart 12 are the electrical connections 94 to the main controller. The main controller is supplied with a cable assembly 96 which includes a 4-pin, quick disconnect bayonet plug 98 (see FIG. 12). The plug 98 connects directly to the receptacle 100 on the cart and indexes in place to ensure a positive electrical connection. This connection must be made whenever the cart is to be used to rethermalize meals.

In order to permit each tray to be reasonably secured at each shelf level, along the side panels are track angles 106 (see FIG. 5) which support the trays when they are inserted in the shelves of the cart 12. When the trays are thus inserted, they are slid along the tracks 106 until the tray travels over the heater pads. A tray stop 108 (see FIG. 8) is positioned along the track 106. This stop 108 prevents misalignment of the tray which would cause improper rethermalization.

The rethermalization cart assembly of this invention also provides for the activation or deactivation of the heating pad elements of each tray level being controlled by one of a plurality of individual selector switches, such as 110, 112 and 114, as shown in FIG. 2. Each individual selector switch controls all the heater pads of every tray shelf as a set or subset.

In order to protect the selector switches from accidental contact each of these individual selector switches is provided within a channel 136 recessed from the exterior surface of cart 12 (see FIG. 5). To that end, the cart 12 includes a vertical extrusion 130 provided along side exterior surfaces 132 and 134 of the cart. Each vertical extrusion includes a pair of frame members 135a and b forming the recessed channel 136 therebetween into which the individual selector switches are positioned. The free end 138 of each individual selector switch is horizontally recessed from the outer surface 140 of the frame members such that each selector switch is protected from accidental contact. Each vertical extrusion also includes a loop member 142 into which an arc-shaped member 144 is formed in the opening 146 thereof.

Figure 10:
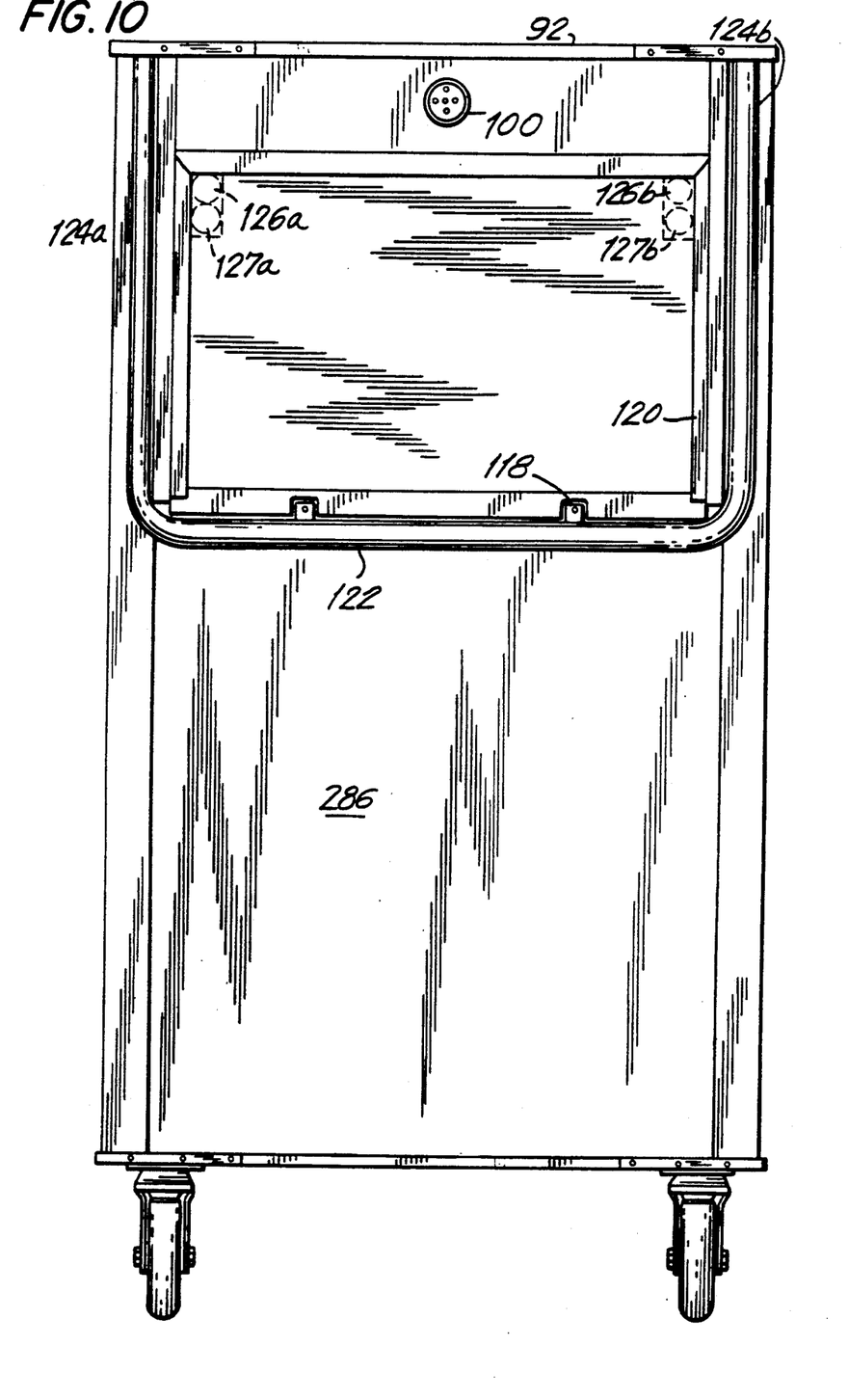
FIG. 10 is a rear elevational view taken along line 10—10 of FIG. 2.
Figure 11:
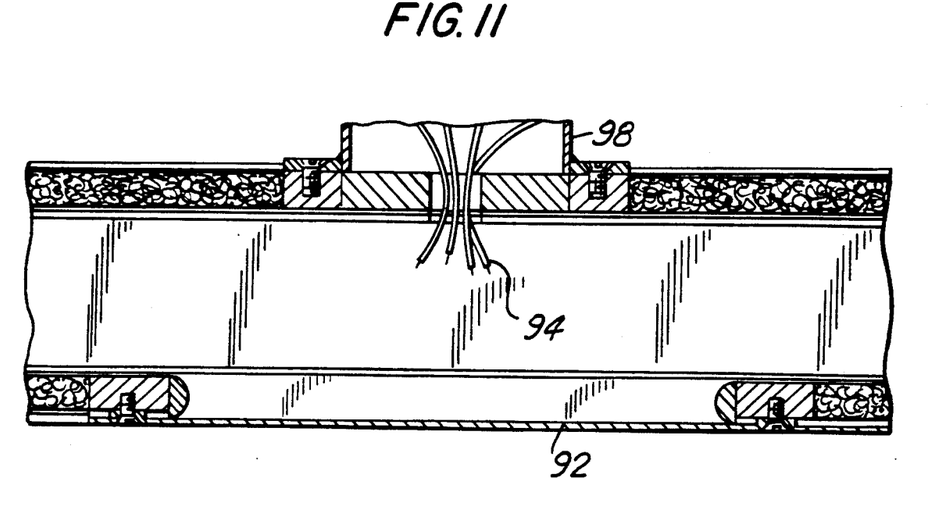
FIG. 11 is a top cross-sectional view partly broken away illustrating the wires emanating from the heater grid assemblies being contained within a box channel and a channel raceway of the vertical extrusions.

In another preferred embodiment, a hinged boss pin 118 is attached to the rear panel 28b which provides for a hinging, fold-up service station 120. For purposes of illustration, in the Figures, the work station 120 has been provided adjacent the rear panel 28b. As shown in FIGS. 1, 2 and 10, this workstation is moveable between a first position, wherein the station extends outwardly from the cart so that each tray can be placed thereon for preparation, and a second position, wherein the tray is closely confined to the rear panel 28b of the cart 12. In its first position, the workstation rests upon a crossbar 122 connected to a pair of handrails 124a and b extending outwardly from the exterior surface of the cart. The handrails 124a and b are mounted to a pair of rails 125 extending outwardly from the cart. As such, the crossbar 122 provides for a steady support of the workstation in its down position. In the second or up position, the workstation 120 is held closely confining the exterior surface of the cart by magnets 126a and b which may be mounted on rear panel 28b and magnets 127a and b embedded in the workstation.

In order to correlate each tray level with its corresponding selector switch, numerals 128 (see FIG. 1) designating the number of each tray level are provided within the channel 136 of the vertical extrusion along the side panels. These tray level numbers provide for a numeric designation of the selector switches (FIG. 10). This serves as a aid to the user when determining which tray levels are to be activated or deactivated as a simple numeric correlation may be made between the tray level and the individual selector switches. Additionally, above and below each shelf identification means, a hot-cold label 150 is provided such that the operator may easily turn the switch to its hot or cold position thereby indicating whether a hot or cold meal is in that shelf.

While the invention has been particularly shown and described with reference to a preferred embodiment, it will be readily appreciated by those of ordinary skill in the art that various changes and modifications may be made therein without departing from the spirit and scope of the invention. It is intended that the appended claims be interpreted as including the foregoing as well as various other such changes and modifications.

What is claimed:

1. An apparatus for storing, refrigerating and heating food items in serving containers comprising:
   a plurality of trays, each tray having a plurality of food compartments and openings for supporting one of a plurality of serving containers containing the food items, each said serving container having food to be heated being covered;
   a cart having interior and exterior surfaces including a plurality of shelves, each said shelf having means for supporting at least one of said plurality of trays thereon and having heating means capable of conforming to said openings so that said covered serving containers positioned thereon are heated before serving, said heating means being unconnected with respect to said trays such that said trays are inserted into said shelves in the same orientation;
   wherein each heating means includes a plurality of heater pads each having separate heating control means, each corresponding heater pad for each shelf being connected to the same control means such that the heating requirements of each corresponding heater pad for any shelf when activated are the same, and each said heater pad having a mounting flange which mates with a box channel running the width of said cart at each said shelf to releasably secure each individual heater pad to said shelf; and
   refrigeration means capable of receiving said cart therein and refrigerating the food items within the serving containers.

2. The apparatus of claim 1 wherein each heater pad is secured by fastening means which passes through the flange of the casting into said box channel.

3. The apparatus of claim 1 wherein electrical connection means connecting each said heater pad to corresponding temperature control means run inside said box channel.

4. The apparatus of claim 1 wherein said box channel includes a base member and a protective top member overlying said base member to provide a cover for said box channel.

5. The apparatus of claim 4 wherein said base member includes an upwardly extending member having a ball member at its free end which engages a slot formed between two downwardly depending flange members of said top member to securely retain said top member above said base member.

6. The apparatus of claim 4 wherein said top member includes a pair of outwardly extending flange members which rest upon a pair of side members of said base member to provide said box channel cover.

7. The apparatus of claim 4 wherein said top cover includes an upwardly extending flange member which separates each said shelf into two tray compartments and provide a forward stop for each tray.

8. An apparatus for storing, refrigerating and heating food items in serving containers comprising:
   a plurality of trays, each tray having a plurality of food compartments and openings for supporting one of a plurality of serving containers containing the food items, each said serving container having food to be heated being covered;
   a cart having interior and exterior surfaces and including a plurality of shelves, each said shelf having means for supporting at least one of said plurality of trays thereon and having heating means capable of conforming to said openings so that covered serving containers positioned thereon are heated before serving wherein each heating means includes a plurality of heater pads mounted to said shelf, said heating means being unconnected with respect to said trays such that said trays are inserted into said shelves in the same orientation;
   refrigeration means capable of receiving said cart therein and refrigerating the food items within the serving containers; and
   a main controller delivering a predetermined timed electrical voltage to each heater pad such that the temperature of each set of corresponding heater pads for each shelf when activated are the same, said main controller including a voltage transformer which accepts 208/230 VAC input and delivers the necessary output voltage and current to said heater pads.

9. The apparatus of claim 8 wherein said main controller includes a three event, 24 hour, automatic timer.

10. An apparatus for storing, refrigerating and heating food items in serving containers comprising:
    a plurality of trays, each tray having a plurality of food compartments and openings for supporting one of a plurality of serving containers containing the food items, each said serving container including food to be heated being covered;
    a cart having interior and exterior surfaces and including a plurality of shelves, each said shelf having means for supporting at least one of said plurality of trays thereon and having heating means capable of conforming to said openings so that said covered serving containers positioned thereof are heated before serving, each heating means including a plurality of heater pads;
    each said heater pad having mounting means which mates with a box channel running generally the width of said cart at each said shelf to releasably secure each individual heater pad to said shelf and wherein electrical connection means connecting each said heater pad to corresponding temperature control means runs inside said box channel; and
    refrigeration means capable of receiving said cart therein and refrigerating the food items within the serving containers.

11. The apparatus of claim 10 wherein each heater pad is secured by fastening means which passes through the flange of the casting into said box channel.

12. An apparatus of claim 10 wherein said box channel includes a base member and a protective top member overlying said base member to provide a cover for said box channel.

13. An apparatus of claim 12 wherein said base member includes an upwardly extending member having a ball member at its free end which engages a slot formed between two downwardly depending flange members of said top member to securely retain said top member above said base member.

14. An apparatus of claim 12 wherein said top member includes a pair of outwardly extending flange members which rests upon a pair of side members of said base member to provide said box channel cover.

15. An apparatus of claim 12 wherein said top cover includes an upwardly extending flange member which separates each said shelf into two tray compartments and provides a forward stop for each tray.

16. An apparatus for storing, refrigerating and heating food items in serving containers comprising:

a plurality of trays, each tray having a plurality of food compartments and openings for supporting one of a plurality of serving containers containing the food items, each said serving container having food to be heated being covered;

a cart having interior and exterior surfaces and including a plurality of shelves, each said shelf having means for supporting at least one of said plurality of trays thereon and having heating means capable of conforming to said openings so that said covered serving containers positioned thereon are heated before serving;

refrigeration means capable of receiving said cart therein and refrigerating the food items within the serving containers; and wherein each heating means includes a plurality of heater pads each having separate heating control means, each corresponding heater pad for each shelf being connected to the same control means such that the heating requirements of each corresponding heater pad for any shelf when activated are the same and wherein each said heater pad has a mounting flange which mates with a box channel running the width of said cart at each said shelf to releasably secure each individual heater pad to said shelf.

17. An apparatus for storing, refrigerating and heating food items in serving containers comprising:

a plurality of trays, each tray having a plurality of food compartments and openings for supporting one of a plurality of serving containers containing the food items, each said serving container having food to be heated being covered;

a cart having interior and exterior surfaces and including a plurality of shelves, each said shelf having means for supporting at least one of said plurality of trays thereon and having heating means capable of conforming to said openings so that covered serving containers positioned thereon are heated before serving wherein each heating means includes a plurality of heater pads mounted to said shelf;

refrigeration means capable of receiving said cart therein and refrigerating the food items within the serving containers; and a main controller delivering a predetermined electrical current to each heater pad such that the temperature of each set of corresponding heater pads for each shelf when activated are the same, wherein said main controller includes a voltage transformer which accepts 208/230 VAC input and delivers the necessary output voltage and current to said heater pads.

18. An apparatus for storing, refrigerating and heating food items in serving containers comprising:

a plurality of trays, each tray having a plurality of food compartments and openings for supporting one of a plurality of serving containers containing the food items, each said serving container having food to be heated having a cover;

a cart having interior and exterior surfaces and including a plurality of shelves, each said shelf having means for supporting at least one of said plurality of trays thereon and having heating means capable of conforming to said openings so that covered serving containers positioned thereon are heated before serving wherein each heating means includes a plurality of heater pads mounted to said shelf;

refrigeration means capable of receiving said cart therein and refrigerating the food items within the serving containers; and a main controller delivering a predetermined times electrical voltage to each heater pad such that the temperature of each set of corresponding heater pads for each shelf when activated are the same, and wherein said main controller includes a three event, 24 hour, automatic timer.

19. The apparatus of claim 18 wherein said main controller includes a 4-pin, bayonet plug which connects directly to receptacle means within said cart.

20. A cart for supporting a plurality of trays having a plurality of food compartments and openings for supporting one of a plurality of serving containers containing food items, the cart comprising:

a plurality of shelves with each shelf having means for supporting at least one of the plurality of trays thereon and having heating means capable of conforming to the openings so that the serving containers positioned thereon are heated before serving, each heating means including a plurality of heater pads; and each said heater pad having mounting means which mates with a box channel running generally the width of the cart at each said shelf to releasably secure each individual heater pad to said shelf and wherein electrical connection means connecting each said heater pad to corresponding temperature control means runs inside said box channel.

21. A cart for supporting a plurality of trays having a plurality of food compartments and openings for supporting one of a plurality of serving containers containing food items, the cart having interior and exterior surfaces and comprising:

a plurality of shelves with each shelf having means for supporting at least one of the plurality of trays thereon and having heating means capable of conforming to the openings so that the serving containers positioned thereon are heated before serving; and each heating means including a plurality of heater pads each having separate heating control means, each corresponding heater pad for each shelf being connected to the same control means such that the heating requirements of each corresponding heater pad for any shelf when activated are the same and wherein each said heater pad has a mounting flange which mates with a box channel running the width of said cart at each said shelf to releasably secure each individual heater pad to said shelf.

* * * * *